Figure 1:
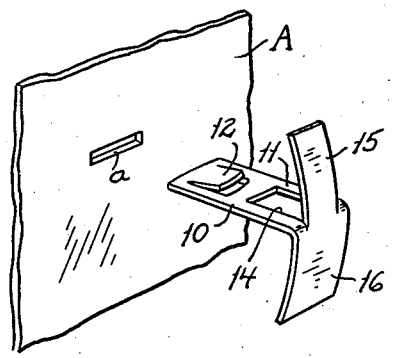

May 11, 1943. G. A. HANSMAN 2,319,059
FASTENING DEVICE
Original Filed April 6, 1939

INVENTOR.
George A. Hansman,
BY
Bates, Team & McBean,
Attorneys.

Patented May 11, 1943

2,319,059

UNITED STATES PATENT OFFICE 2,319,059

FASTENING DEVICE

George A. Hansman, Rocky River, Ohio, assignor to Tinnerman Products, Inc., Cleveland, Ohio, a corporation of Ohio Original application April 6, 1939, Serial No. 266,363. Divided and this application July 22, 1942, Serial No. 451,856

2 Claims. (Cl. 85—5)

This invention relates to locking stud fasteners of the character designed for use in installations in which a relatively long shank is required to provide a positive holding means at a point a substantial distance from the head of the fastener. More particularly, my fastener is a sheet metal strip formed into a head, a shank integral therewith and bent from the head, a yielding tongue cut from the shank and diverted therefrom, providing a barb adapted to snap behind a member having a narrow opening through which the fastener may be passed.

The object of the invention is to provide the fastener of such characteristics that it may be cheaply constructed from a single flat strip of sheet metal, may be readily applied and will be efficient in service.

The present application is a division of my pending application No. 266,363, filed April 6, 1939.

My invention is hereinafter more fully described in connection with a preferred embodiment illustrated in the drawing and the essential novel features are set out in the claims.

Figure 2:
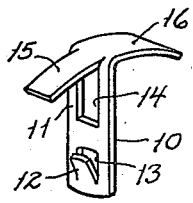
Figure 3:
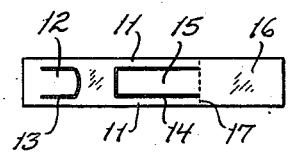
Figure 4:
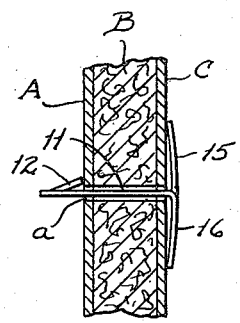
Figure 5:
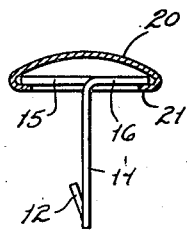
Figure 6:
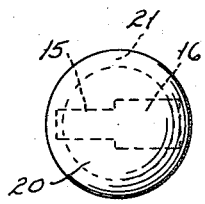

In the drawing, Fig. 1 is a perspective view of the locking stud fastener of this application shown in the relation it assumes, being applied through a narrow aperture in a supporting wall, also shown in the perspective; Fig. 2 is a perspective of the fastener itself; Fig. 3 is a plan of the blank with slits therein ready for the formation of the fastener by the mere act of bending the blank; Fig. 4 is a sectional view of an installation embodying this fastener; Fig. 5 is an elevation, partly sectional, of my fastener provided with a finishing cap mounted on the fastener head; Fig. 6 is a plan of such cap-equipped fastener.

Referring now more particularly to the drawing, Fig. 1 shows a preferred form of locking stud fastener of the invention in the relation it assumes on being applied for fastening engagement through a cooperating aperture in a supporting wall, such as an automobile dashboard, which may be constructed of any suitable material such as sheet metal, wood, fibre board, or the like. A fragment of the supporting wall is designated generally A, and inasmuch as the instant invention is intended mainly for use with metallic structures, such supporting wall usually is in the form of a metallic panel or plate-like element which is provided with perforations disposed at regular intervals and suitably spaced points along which the trim material or an insulation pad extends in mounted position.

The perforations mentioned preferably consist of substantially rectangular slots $a$, as shown in Fig. 1, to receive the substantially flat shank of the fastener snugly and thereby retain the same against shifting or displacement from applied fastening position in a completed installation.

My fastener, designated 10, is provided from a thin, parallel sided strip of sheet metal such as represented in Fig. 3, wherein a portion of the strip forms a shank leg 11 on which is a lug holding element 12 partially severed from the shank by a U-shaped slit 13 and bent at an acute angle to the shank while projecting toward the head, to be described.

Intermediate its length the blank is suitably cut (by a U-shaped slit 14 facing in the other direction) to define a tongue 15 which, together with the end portion 16, forms the head member of the device when the blank is bent along dotted line 17 to substantially the position shown in Fig. 1, 2, 4, or 5 to extend in a direction approximately at right angles to the shank of the fastener.

After the end portion of the blank has been bent in one direction with reference to the shank and the tongue 15 in substantially the opposite direction, a T-shaped fastener is produced made of a single piece of metal and having a head, a flat shank extending from the mid-region of the head and a barb projecting from the bottom portion of the shank in an inclined direction toward the head. This makes an extremely simple device.

When the shank is passed through a narrow opening only slightly larger than the shank, as illustrated at $a$ in Fig. 1, the barb 12 thereof readily passes through the opening but will spring behind the plate having the opening and thus lock the fastener in place. This is illustrated in Fig. 4 where in addition to the metal plate A having the opening $a$ I have shown a sheet B of considerable thickness faced by a thin plate C. The fastener passes through all these members, with the head engaging the outer face of the plate C and the barb engaging the opposite face of the plate A.

The head sections 15 and 16 may be formed in a generally concave configuration of a single continuous curvature as shown in Figs. 1 and 2 to provide a resilient arched head designed to supply a spring take-up action for an installation in which a plurality of more or less rigid, non-flexible parts are secured.

As shown in Fig. 4 there may be a stiff fibre board insulation B or the like, which I can effectively secure to the apertured supporting panel A together with a covering of rigid trim material C, for example, by means of a fastener of this type in substantially the manner aforesaid even though the fibre board is not sufficiently soft and compressible to provide the desired tight, rigid connection. The fastener head becomes somewhat flattened during the application and thus, when pressure is removed from the head of the fastener after the lug holding element 12 is disposed in positive locked engagement with the support, the arched head sections 15, 16 produce the necessary axial drawing action on the shank of the fastener to provide a tight, rigid installation of the parts secured under continuously effective spring tension.

As shown in Figs. 5 and 6, a head structure of the general formation described but preferably flat is particularly suited for having attached thereto a finishing cap in the form of a sheet metal disk 20 or the like. The peripheral edge portions 21 of the cap are crimped over the ends of the head sections 15, 16 or otherwise formed in the manner of inturned flanges behind which the substantially flat head sections of the fastener lie. The mounting may be accomplished by flexing the head into the interlocked relation with the cap flange or by bending the flange beneath the head.

It will be seen that my fastener, in either of the forms shown, may be constructed in an extremely simple manner. A blank comprising a parallel-sided strip of sheet metal is cut in the peculiar manner illustrated in Fig. 3 and then is bent to produce a T-head, a shank extending substantially centrally therefrom and the locking barb bent from the body of the shank. When the head of the fastener is of the arched form illustrated in Fig. 2, the additional advantage of automatically applying tension to the shank of the installed fastener is obtained.

When the button head is employed, I prefer to omit the step of curving the head, leaving the two arms flat and aligned so that the head has the form shown in Fig. 5. In any case, whether the integral sheet metal head is left exposed as in Figs. 1, 2 and 4, or carries the button cap, as in Figs. 5 and 6, the formation of the fastener proper with its head, shank and barb is extremely simple, it being only necessary to form the slits 13 and 14 in a flat parallel-sided strip of sheet metal and then to bend the blank.

I claim:

1. A locking stud fastener for securing an article to an apertured support, said fastener being made from a single parallel-sided strip of sheet metal cut and bent to provide a projecting shank and a head, said head being formed by bending the metal in two directions so that it forms a continuous T at the top of the shank and the shank being of the thickness of the strip and provided with a lug element narrower than the shank and formed from a laterally intermediate region thereof by an inverted U-shaped slit and bent to project normally in a single plane at an acute angle to the shank toward the head of the fastener, said fastener being of spring material so that the lug element may yield substantially into the plane of the shank in passing through the aperture and may thereafter spring outwardly to have its end abut the opposite side of the support.

2. A fastener of the character described made of a single strip of flat spring sheet metal and comprising a T-head, a flat shank leading therefrom and having the thickness of the strip, and a barb on the shank extending in a single plane at an acute angle to the shank but in the general direction toward said head, the portion of said T-head on one side of the shank comprising a bent-over portion of the strip itself, the portion of the T-head on the other side of the shank comprising a tongue cut from the shank by an upwardly facing U-shaped slit and bent in a generally opposite direction, and the barb being cut from the shank by a downwardly facing U-shaped slit and normally diverging from the shank in a single plane continuously from the region of its attachment to the shank to the upper end of the barb, the barb being adapted to be forced substantially into the plane of the shank, enabling the shank to be inserted through an opening only slightly larger than the cross section of the shank and thereafter retained by the barb returning to its normal position with its free end at the side of the opening through which it was forced.

GEORGE A. HANSMAN.